United States Patent Office 2,802,812
Patented Aug. 13, 1957

2,802,812

P-ALKYL STYRENES AND THEIR POLYMERS

Charles G. Overberger, Brooklyn, N. Y., assignor to L. A. Dreyfus Company, Oak Tree, N. J., a company of New York No Drawing. Application June 26, 1953,
Serial No. 364,473

13 Claims. (Cl. 260—93.5)

This invention relates to polymers of alkyl styrenes, and to intermediates for making the same including alkyl acetophenones, alkylphenyl methyl carbinols, and alkyl styrenes, particularly where the alkyl group is in the para position in any of the stated compounds, derivatives, and polymers, and especially where higher alkyl groups are present in the p-alkyl styrenes and polymers made therefrom.

Among the objects of the present invention is the production of higher p-alkyl styrenes and their polymers as well as intermediates for the production of said styrenes and polymers.

Still further objects and advantages of the present invention will appear from the more detailed description set forth below, it being understood that such more detailed description is given by way of illustration and explanation only, and not by way of limitation, since various changes therein may be made by those skilled in the art without departing from the scope and spirit of the present invention.

In accordance with the present invention higher p-alkyl styrenes are synthesized and particularly utilized in the preparation of polymers useful for a variety of purposes. Such p-alkyl styrenes which are a part of this invention, because of their utilization in the production of polymers, are para alkyl styrenes in which the alkyl group is a primary normal alkyl group of at least six carbon atoms, including the higher alkyl derivatives such as tetradecyl, hexadecyl, octadecyl, etc. The alkyl group is not limited to even numbered carbon atom groups but odd numbered carbon groups may also be prepared as will be illustrated. As will be pointed out below the para n-alkyl styrenes up to dodecyl have a density ($d_4^{25}$) of less than about 0.9000 while beginning with the tetradecyl derivative they are solids having a melting point of not less than about 26° C.

The p-alkyl styrenes may be prepared by a variety of established procedures. For example, benzene may be acylated to give an n-alkyl phenyl ketone and the latter reduced to an n-alkyl benzene. The n-alkyl benzene may then be acetylated by conventional Friedel-Crafts procedures to give p-acetyl-n-alkyl benzenes, and the latter reduced to p-n-alkyl phenyl-methyl carbinols which are then dehydrated to the desired p-n-alkyl styrenes. Since many of the intermediate compounds are novel, the following tabulations are given of such novel compounds and their properties.

The p-alkylacetophenones, whose properties are described in Table I, were prepared by the method of Mowry, Renoll and Huber adapted from that of Perrier. An alkyl benzene is added to a pre-formed complex of acetyl chloride and aluminum trichloride dissolved in an inert solvent. After the reaction has ceased, the mixture is neutralized and extracted to remove the p-alkyl acetophenone. After the extracting solvent has been removed, the crude product is purified by distillation or recrystallization.

*References.*—Mowry, Renoll and Huber, J. Am. Chem. Soc., 68, 1105 (1946), G. Perrier, Ber., 33, 815 (1900).

TABLE I

*p-Alkyl substituted acetophenones*

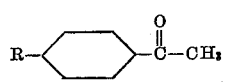

| R-group | B. P., ° C./mm. | M. P. | Yield, Percent | Formula | Percentage Composition | | | |
|---|---|---|---|---|---|---|---|---|
| | | | | | Carbon | | Hydrogen | |
| | | | | | Calcd. | Found | Calcd. | Found |
| n-$C_{10}H_{21}$ | 166–168/1.5 | 37–37.5 | a 94 | $C_{18}H_{28}O$ | 83.02 | 82.97 | 10.84 | 11.02 |
| n-$C_{12}H_{25}$ | | 47.0–48.0 | b 69.7 | $C_{20}H_{32}O$ | 83.27 | 83.06 | 11.18 | 10.91 |
| n-$C_{14}H_{29}$ | | 54.3–55.4 | c 75.0 | $C_{22}H_{36}O$ | 83.48 | 83.44 | 11.46 | 11.72 |
| n-$C_{16}H_{33}$ | | 61.0–61.8 | d 59.3 | $C_{24}H_{40}O$ | 83.65 | 83.51 | 11.70 | 11.61 |
| n-$C_{18}H_{37}$ | | 65.9–66.4 | e 61.7 | $C_{26}H_{44}O$ | 83.90 | 83.63 | 11.90 | 11.89 | a Recrystallized from methanol.
b Yield reported on M. P. 46.8–48.8° C. recrystallized from absolute ethanol.
c Yield reported on M. P. 54.0–56.2° C. recrystallized from ethyl ether.
d Recrystallized from 1:2 ethyl ether-methanol.
e Yield reported on M. P. 58.6–64.2° recrystallized from 1:1 ethyl ether-methanol.

Table II summarizes the properties of the novel p-alkylphenyl methyl carbinols prepared from the corresponding p-alkyl acetophenones by reduction with aluminum isopropoxide. The method used was that described by A. L. Wilds.

*Reference.*—A. L. Wilds, "Organic Reactions," vol. II, John Wiley and Sons, Inc., New York, N. Y., 1944, p. 203.

TABLE II p-Alkylphenylmethylcarbinols

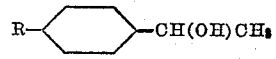

| R-group | B. P., °C./mm. | M. P. | Yield, Percent | Formula | Percentage Composition | | | |
|---|---|---|---|---|---|---|---|---|
| | | | | | Carbon | | Hydrogen | |
| | | | | | Calcd. | Found | Calcd. | Found |
| n-$C_6H_{13}$ a | 119-120/2 | | 86.0 | $C_{14}H_{22}O$ | 81.50 | 81.27 | 10.75 | 10.93 |
| n-$C_8H_{17}$ | 137-138/1 | 25-26 | 91.5 | $C_{16}H_{26}O$ | 81.99 | 81.78 | 11.18 | 11.23 |
| n-$C_9H_{19}$ | 151-153/2 | | 70.3 | $C_{17}H_{28}O$ | 82.20 | 82.46 | 11.36 | 11.45 |
| n-$C_{10}H_{21}$ | 153/1 | 39-40 | 61.5 | $C_{18}H_{30}O$ | 82.38 | 82.48 | 11.52 | 11.81 |
| n-$C_{12}H_{25}$ b | | 49.0-49.6 | 82.2 | $C_{20}H_{34}O$ | 82.69 | 82.57 | 11.80 | 11.65 |
| n-$C_{14}H_{30}$ | | 56.6-57.0 | c 78.7 | $C_{22}H_{38}O$ | 82.95 | 83.28 | 11.87 | 11.87 |
| n-$C_{16}H_{33}$ | | 62.9-63.4 | d 81.0 | $C_{24}H_{42}O$ | 83.17 | 83.33 | 12.22 | 12.12 |
| n-$C_{18}H_{37}$ | | 68.0-68.4 | e 93.0 | $C_{26}H_{46}O$ | 83.35 | 83.32 | 12.38 | 12.25 | a $n_D^{25}$ 1.5030, $d_4^{25}$ 0.9282.
b Hydroxyl value, calcd. 193.5; found 189.7. Yield reported on M. P. 48.0-50.0° recrystallized, from ethanol.
c Yield reported on M. P. 57.0-57.5°, recrystallized from petroleum ether (B. P. 28-38°).
d Yield reported on M. P. 62.8-63.3°, recrystallized from petroleum ether (B. P. 28-38°).
e Yield reported on M. P. 67.4-67.9°, recrystallized from petroleum ether.

The p-alkyl styrenes described in Table III were prepared by dehydration of the corresponding p-alkyl-phenyl methyl carbinols with $KHSO_3$ using the method of Overberger and Saunders. In all cases the styrenes were removed by distillation from the reaction mixture. For the higher boiling styrenes, pressures of 1 to 2 mm. were used during dehydration. p-Alkyl $C_6$, $C_8$, $C_9$, $C_{10}$, $C_{12}$, and $C_{14}$ styrenes were purified by successive distillation, p-$C_{16}$ and $C_{18}$ styrenes were recrystallized from petroleum ether (B. P. 28-36°). Monomers were stored with inhibitor, usually p-tert-butyl catechol and purified by removing inhibitor with dilute sodium hydroxide followed by distillation or recrystallization before analysis and polymerization.

*Reference.*—C. G. Overberger and J. H. Saunders, "Organic Reactions," John Wiley and Sons, Inc., New York, N. Y., 1948, vol. 28, p. 31.

TABLE III p-Alkylstyrenes

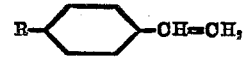

| R-group | B. P., °C./mm. | $n_D^{25}$ | $d_4^{25}$ | Yield, Percent a | Formula | Percentage Composition | | | |
|---|---|---|---|---|---|---|---|---|---|
| | | | | | | Carbon | | Hydrogen | |
| | | | | | | Calcd. | Found | Calcd. | Found |
| n-$C_6H_{13}$ | 89-90/1 | 1.5156 | 0.8742 | b 75.5 | $C_{14}H_{20}$ | 89.29 | 89.37 | 10.71 | 10.60 |
| n-$C_8H_{17}$ | 113-114/1 | 1.5100 | 0.8714 | b 78.4 | $C_{16}H_{24}$ | 88.82 | 88.66 | 11.18 | 11.51 |
| n-$C_9H_{19}$ | 140-145/2.3-2.5 | 1.5055 | 0.8802 | c,d 51.6 (41.2) | $C_{17}H_{26}$ | 88.62 | 88.63 | 11.38 | 11.47 |
| n-$C_{10}H_{21}$ | 139-143/1 | 1.5045 | 0.8706 | b 85.5 | $C_{18}H_{28}$ | 88.45 | 88.32 | 11.55 | 11.68 |
| n-$C_{12}H_{25}$ | 158-163/1.2-1.4 | 1.5011 | 0.8831 | e 55.4 (49.5) | $C_{20}H_{32}$ | 88.16 | 87.79 | 11.84 | 11.88 |
| n-$C_{14}H_{29}$ | 192-196/2.2 | M. P. 26.0-27.0 | | f 92.0 (35.6) | $C_{22}H_{36}$ | 87.92 | 87.69 | 12.08 | 12.00 |
| n-$C_{16}H_{33}$ | | M. P. 30.8-31.4 | | g 32.6 (16.3) | $C_{24}H_{40}$ | 87.73 | 87.90 | 12.27 | 12.41 |
| n-$C_{18}H_{37}$ | | M. P. 38.3-39.0 | | h 66.4 (53.6) | $C_{26}H_{44}$ | 87.56 | 87.32 | 12.44 | 12.29 | a Yield of $C_6$, $C_8$ and $C_{10}$ based on recovered carbinol; yield of $C_9$, $C_{12}$, $C_{14}$, $C_{16}$ and $C_{18}$ based on monomer plus polymer; yield in parenthesis only based on monomer.
b Charge of carbinol 25 g., 1 g. fused $KHSO_4$, 0.259 g. hydroquinone, dropwise procedure, reaction temperatures 170-240° at 7 mm.
c Charge of carbinol 8-15 g., 1 g. fused $KHSO_4$, 0.19 g. tert-butyl catechol. Dodecylstyrene prepared by dropwise procedure, but $C_9$, $C_{14}$, $C_{16}$ and $C_{18}$ styrenes prepared by allowing portions of carbinol (2-3 ml.) to react at 25-50 mm. and distilling by reducing the pressure to less than 5 mm.
d Main reaction temperature, 220-250°.
e 220-250°.
f 260-275°.
g 220-253°.
h 250-277°.

TABLE IV

Polymers of the p-alkylstyrenes

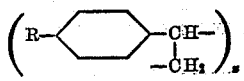

| R-group | $[\eta]$ [h] | Transition Temp., °C. | Formula | Percentage Composition ||||
|---|---|---|---|---|---|---|---|
| | | | | Carbon || Hydrogen ||
| | | | | Calcd. | Found | Calcd. | Found |
| n-C$_2$H$_5$ [a] | 2.02 | 27 | (C$_{10}$H$_{12}$)$_x$ | 90.85 | 91.10 | 9.15 | 9.02 |
| n-C$_4$H$_9$ [a] | 1.28 | 6 | (C$_{12}$H$_{16}$)$_x$ | 89.94 | 89.81 | 10.06 | 9.94 |
| n-C$_6$H$_{13}$ [a] | 1.57 | −27 | (C$_{14}$H$_{20}$)$_x$ | 89.29 | 89.15 | 10.71 | 10.57 |
| n-C$_8$H$_{17}$ [a] | 1.11 | −45 | (C$_{16}$H$_{24}$)$_x$ | 88.82 | 89.22 | 11.18 | 10.90 |
| n-C$_9$H$_{19}$ [b,c] | 1.25 | −53 | (C$_{17}$H$_{26}$)$_x$ | 88.62 | 87.96 | 11.38 | 11.18 |
| n-C$_{10}$H$_{21}$ [a] | 0.90 | −65 | (C$_{18}$H$_{28}$)$_x$ | 88.45 | 88.74 | 11.55 | 11.36 |
| n-C$_{12}$H$_{25}$ [b,d] | 0.46 | −52 | (C$_{20}$H$_{32}$)$_x$ | 88.16 | 87.50 | 11.84 | 11.84 |
| n-C$_{14}$H$_{30}$ [b,e] | 1.30 | −36 | (C$_{22}$H$_{36}$)$_x$ | 87.92 | 88.11 | 12.08 | 12.22 |
| n-C$_{16}$H$_{33}$ [b,f] | 1.33 | 4.5 | (C$_{24}$H$_{40}$)$_x$ | 87.73 | 87.70 | 12.27 | 12.18 |
| n-C$_{18}$H$_{37}$ [b,g] | 1.44 | [i] 32 | (C$_{26}$H$_{44}$)$_x$ | 87.56 | 87.47 | 12.29 | 12.39 |

[a] Polymerized at 70° with benzoyl peroxide as a catalyst. Precipitated from benzene with methanol.
[b] Polystyrenes contained some benzene-insoluble polymer which was removed.
[c] Polymerized with ultraviolet light and traces of benzoyl peroxide for 96 hrs.; precipitated three times with equal volumes of a 50:50 ethyl ether/methanol mixture from benzene.
[d] Polymerized with ultraviolet light for 90 hrs., precipitated three times with equal volumes of methanol from petroleum ether (B. P. 28–38°) and benzene.
[e] Polymerized with ultraviolet light and trace of benzoyl peroxide (144 hrs.), precipitated three times with four times the volume of acetone from benzene.
[f] Polymerized with ultraviolet light and trace of benzoyl peroxide (160 hrs.); precipitated with two times the volume of acetone from benzene.
[g] Polymerized by ultraviolet light and a trace of benzoyl peroxide (160 hrs.), precipitated as in (f).
[h] Ubbelohde viscometer used and specific viscosity determined on polymer solutions in redistilled anhydrous toluene.
[i] Not determined refractometrically, softening point in capillary tube.

The polymerization of the C$_2$, C$_4$, C$_6$, C$_8$ and C$_{10}$ styrenes was carried out in the following way. In a standard test tube were placed 2 parts by weight of the monomer and 0.1% by weight of benzoyl peroxide. The air in the tube was displaced with carbon dioxide and the tube sealed. The tubes were then heated in a water bath at 70° until no flow could be observed. The polymers were dissolved in benzene and the filtered solution added slowly with rapid stirring into a large excess of methanol. After 5 such precipitations, the polymers were dried in a vacuum dessicator for several days.

The C$_9$, C$_{14}$, C$_{16}$ and C$_{18}$ alkylstyrenes were polymerized in a similar manner under nitrogen except that only .01 to .03% by weight of benzoyl peroxide was used and the monomers were exposed to ultra-violet light. The approximate temperature under the light was 70° C. Precipitation of the benzene solution was carried out with different solvents (Table IV).

As illustrated the polymers may be prepared in bulk in sealed tubes either catalyzed by benzoyl peroxide or ultra-violet light or both. Polymers of approximately similar intrinsic viscosities were produced but this may of course be varied. The polymers were purified by conventional methods (Table IV). The intrinsic viscosities were carried out in toluene in an Ubbelohde viscometer. Transition temperatures (Table IV) were measured by the refractometric method.

The transition temperatures of the polymers have been correlated with the size of the alkyl group. As shown in Table IV the lowest transition temperature is shown by the polymer having n-C$_{10}$ alkyl groups as side-chains.

With the exception of the polymer from p-n-dodecylstyrene, the intrinsic viscosities reported here are all between 0.90 and 2.00, with the majority having values between 1.0 and 1.6. Polymers of the p-alkyl styrenes having either higher or lower intrinsic viscosities than those shown in Table IV may be prepared by suitably varying the conditions of the polymerization.

The said p-alkyl-styrenes may be polymerized to high molecular weight substances by heating in the presence of catalysts which yield free radicals or by irradiating with light of a suitable wave-length. Like styrene itself, these monomeric p-alkyl styrenes may be polymerized using the various techniques commonly employed in the art, that is, by emulsion, bulk, suspension or solution polymerization, with or without the assistance of promoters, modifiers, telemerizing agents, etc. Each p-normal alkyl styrene exhibits a tendency to enter into polymerization in a manner which is characteristic of, and common to, all members of the group. Because of this, mixtures of p-alkyl styrenes may be polymerized to yield copolymers which have mixed side-chains, each of the various p-alkyl styrenes present adding readily to the growing polymer chain in the presence of the others.

The p-alkyl styrenes are valuable in the preparation of polymers including homo polymers, heteropolymers, and copolymers of use in the production of coatings, adhesives, chewing gum base compositions and the like. The proportions of such materials will depend on the properties desired in such compositions and the nature and amounts of other components. The polymers of the p-alkyl styrenes may be utilized to give uniquely desirable characteristics in such compositions with other components commonly used in such mixtures.

While homopolymers and copolymers of the p-alkyl styrenes have been mentioned above, the p-alkyl styrenes may be copolymerized with various other polymerizable materials particularly those containing a CH=CH$_2$ group. As illustrative of such copolymerizing materials there may be mentioned, acrylates and methacrylates, styrene and its derivatives, butadiene, chloroprene, vinyl chloride, methyl vinyl ketone, vinyl esters such as the acetate, etc. The proportions used in making the copolymers may vary widely depending on the properties desired. For example mole ratios of p-alkyl styrene to co-monomer of from about 1:10 to 10:1 may be used. The methods employed may be analogous to those used above for the production of polymers of the alkyl styrenes.

Having thus set forth my invention, I claim:

1. p-Alkyl styrenes wherein the alkyl group is a primary normal alkyl group of at least ten carbon atoms, the p-alkyl styrenes with an alkyl group up to n-C$_{12}$H$_{25}$ having a density ($d_4^{25}$) of less than 0.9000, and the p-alkyl styrenes with more than twelve carbon atoms having a melting point above about 26° C.

2. Polymers of p-alkyl styrenes, the alkyl group being a primary normal alkyl group of at least ten carbon atoms.

3. Polymers as set forth in claim 2 in which the alkyl group has from ten to twelve carbon atoms.

4. Polymers as set forth in claim 2 in which the alkyl group has more than twelve but not more than eighteen carbon atoms.

5. p-Alkyl styrenes wherein the alkyl group is a primary normal alkyl group of at least ten carbon atoms, the p-alkyl styrenes with an alkyl group up to n-$C_{12}H_{25}$ having a density ($d_4^{25}$) of less than 0.9000, and the p-alkyl styrenes with more than twelve carbon atoms having a melting point above about 26° C.

6. p-Alkyl styrenes as set forth in claim 5 in which the p-alkyl group has from ten to twelve carbon atoms and the p-alkyl styrene has a density ($d_4^{25}$) of less than about 0.9000.

7. Polymers of the styrenes of claim 6.

8. Polymers of mixtures of the styrenes of claim 6.

9. p-Alkyl styrenes as set forth in claim 5 in which the alkyl group has more than twelve carbon atoms and the p-alkyl styrene has a melting point above about 26° C.

10. Polymers of the p-alkyl styrenes of claim 9.

11. Polymers of mixtures of the p-alkyl styrenes of claim 9.

12. Polymers of the p-alkyl styrenes of claim 5.

13. Polymers of mixtures of the p-alkyl styrenes of claim 5.

References Cited in the file of this patent

FOREIGN PATENTS 217,134     Switzerland _____ Sept. 30, 1941

OTHER REFERENCES

Sulzbacher et al.: Jour. Organic Chem., vol. 13, pages 303–308 (1948; 6 pages).

Overberger et al.: J. Am. Chem. Soc., 75, 3326–3360, July 1953.